(12) United States Patent
Sugimoto

(10) Patent No.: US 9,085,307 B2
(45) Date of Patent: Jul. 21, 2015

(54) VIBRATION DAMPING SHAPED ALUMINUM EXTRUSION

(75) Inventor: Akio Sugimoto, Kobe (JP)

(73) Assignee: Kobe Steel, Ltd., Hyogo (JP)

( * ) Notice: Subject to any disclaimer, the term of this patent is extended or adjusted under 35 U.S.C. 154(b) by 156 days.

(21) Appl. No.: 13/587,697

(22) Filed: Aug. 16, 2012

(65) Prior Publication Data

US 2013/0042787 A1   Feb. 21, 2013

(30) Foreign Application Priority Data

Aug. 19, 2011   (JP) ................. 2011-179721

(51) Int. Cl.
    *B61D 17/04* (2006.01)
    *B61D 17/18* (2006.01)
    *B61D 17/08* (2006.01)
    *B61D 17/10* (2006.01)
    *F16F 9/30* (2006.01)

(52) U.S. Cl.
CPC .............. *B61D 17/185* (2013.01); *B61D 17/08* (2013.01); *B61D 17/10* (2013.01); *F16F 9/30* (2013.01)

(58) Field of Classification Search
CPC ...... B60R 13/08; B61D 17/185; B61D 17/10; B61C 17/04; E01B 9/68
USPC ........ 105/452, 422, 423, 198.2; 238/382, 283
See application file for complete search history.

(56) References Cited

U.S. PATENT DOCUMENTS

| | | | | |
|---|---|---|---|---|
| 4,794,032 A * | 12/1988 | Fujii et al. | ..................... | 428/209 |
| 4,915,031 A * | 4/1990 | Wiebe | ........................ | 105/198.2 |
| 5,690,035 A | 11/1997 | Hatayama et al. | | |
| 5,895,538 A | 4/1999 | Hatayama et al. | | |
| 6,402,044 B1 * | 6/2002 | Sato | .............................. | 238/382 |
| 6,708,626 B2 * | 3/2004 | Ueda et al. | .................... | 105/452 |

FOREIGN PATENT DOCUMENTS

| | | |
|---|---|---|
| JP | 2640078 B2 | 8/1997 |
| JP | 09-226571 | 9/1997 |
| JP | 2001-138908 | 5/2001 |
| JP | 2006-349191 A | 12/2006 |
| KR | 1020090113011 | 10/2009 |

* cited by examiner

*Primary Examiner* — Mark Le
(74) *Attorney, Agent, or Firm* — Studebaker & Brackett PC

(57) ABSTRACT

A vibration damping shaped aluminum extrusion achieves the features of weight reduction and a high damping effect. The vibration damping shaped aluminum extrusion includes a pair of face plates which face each other and a plurality of ribs connecting the face plates, wherein a damping material is provided at least on the central part of the rib in an inner surface of a hollow part formed by the face plate and the rib. A positioning recess or a positioning protrusion may be formed so that a damping material is provided on the central part of the face plate in an inner surface of the hollow part.

8 Claims, 8 Drawing Sheets

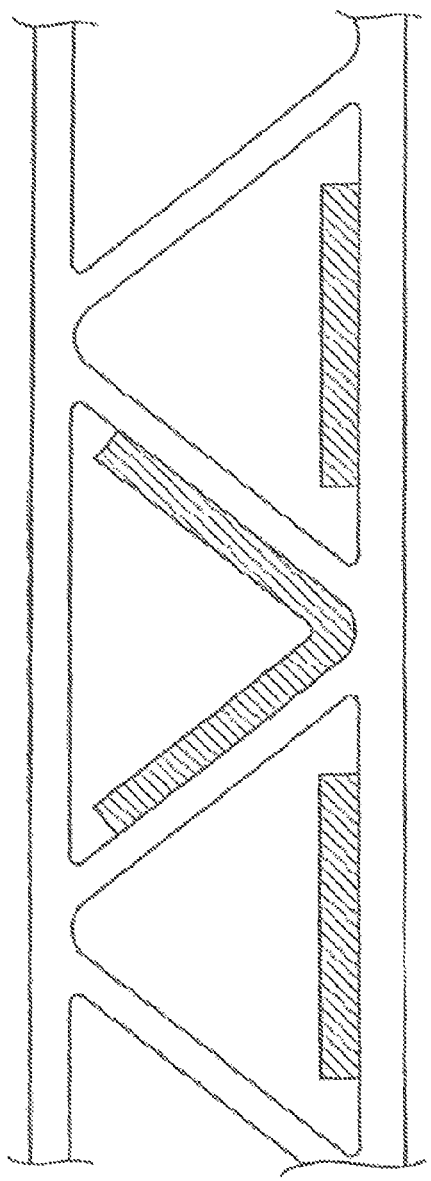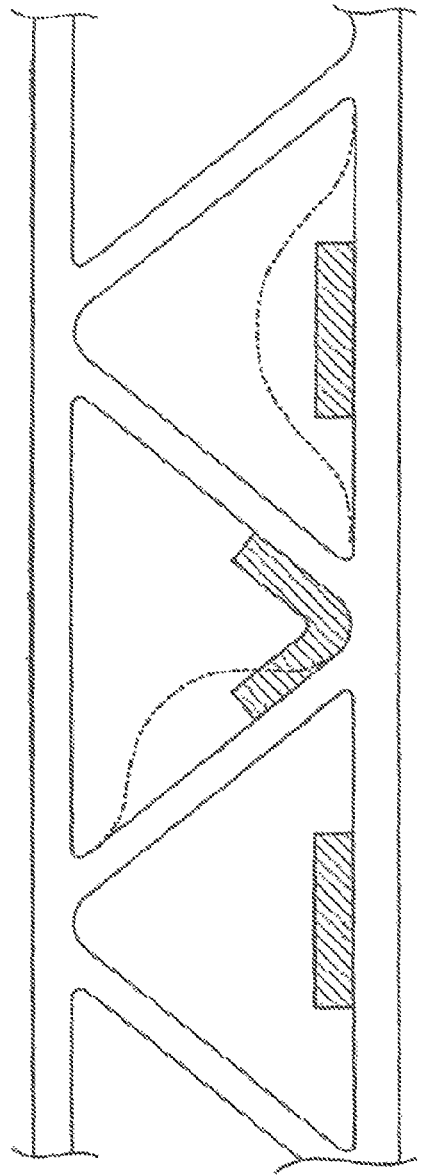
FIG. 8(a)
FIG. 8(b)

VIBRATION DAMPING SHAPED ALUMINUM EXTRUSION

BACKGROUND OF THE INVENTION

1. Technical Field

The present invention relates to a vibration damping shaped aluminum extrusion including a pair of face plates which face each other and a rib connecting these face plates, which is, for example, a vibration damping shaped aluminum extrusion having a truss cross-section and is used for a structure or the like requiring the control of vibration, such as transport structure.

2. Background Art

Conventionally, a lightweight material having high rigidity is required as a structural member for high-speed railway vehicles such as Shinkansen train. Among metal materials, aluminum has a low specific gravity as compared with iron, can realize a high-rigidity cross-sectional profile by extrusion processing, and recently allows for application of a new welding technique capable of suppressing reduction in the strength of the welded part of friction stir welding or the like and therefore, a shaped aluminum extrusion has been widely used as a vehicle structure such as Shinkansen train, subway and existing railway line.

Examples of the shaped aluminum extrusions include a shaped aluminum extrusion called a hollow shaped aluminum extrusion, and examples of the hollow shaped aluminum extrusion include, for example, a truss shaped aluminum extrusion where two face plates are connected by ribs formed in a zigzag manner, and a ladder-shaped aluminum extrusion where two face plates are connected by ribs each substantially perpendicular to the face plates. The hollow shaped aluminum extrusion can increase the rigidity in a cross-section even if the thickness is small, and therefore, the hollow shaped aluminum extrusion is used for a floor surface, a side surface, a ceiling surface and the like of a vehicle.

As described above, the shaped aluminum extrusion is lightweight and can realize high rigidity but because of its low specific gravity, the shaped aluminum extrusion is liable to transmit vibration as compared with a conventionally employed steel-made structural member. Accordingly, in the case of using the shaped aluminum extrusion as a structural member of a vehicle, propagation of vibration noise from a wheel or a motor to a cabin (passenger room) must be more suppressed than the case of using a steel member.

On this account, various methods for controlling vibration of a shaped aluminum extrusion have been devised and, for example, there is a vibration damping shaped aluminum extrusion disclosed in Patent Document 1. The vibration damping shaped aluminum extrusion disclosed in Patent Document 1 is a shaped aluminum extrusion including a pair of face plates and one rib or two or more ribs each connecting the face plates, wherein a damping resin is provided on at least one surface of the rib.

It is demonstrated that according to the vibration damping shaped aluminum extrusion disclosed in Patent Document 1, the sound shielding effect can be enhanced without need for change in shape, such as increase of height, while minimizing the change in weight of the vibration damping shaped aluminum extrusion.

[Patent Document 1] Japanese Patent No. 2,640,078

SUMMARY OF THE INVENTION

However, for example, in a vehicle running at such a high speed as exceeding 200 km per hour, reduction in weight of the vehicle is demanded so as to realize a higher running speed. Reduction in weight of the vehicle is effective not only to enhance the accelerating performance of the vehicle but also to reduce the power consumption necessary for vehicle running and therefore, efforts to reduce the weight of the structural member are made not only in a high-speed railway vehicle but also in a subway or existing railway line vehicle.

Problems encountered when the weight is reduced in a conventional vibration damping shaped aluminum extrusion disclosed, for example, in Patent Document 1 are described below.

FIGS. 8(a) and 8(b) are view showing a cross-section obtained by cutting a shaped aluminum extrusion (vibration damping shaped aluminum extrusion) having a damping resin (damping material) thereon, perpendicularly to the longitudinal direction. FIG. 8(a) is a view showing a conventional vibration damping shaped aluminum extrusion. In a railway vehicle application, the shaped aluminum extrusion has a length of 10 to 25 m in the direction perpendicular to the paper surface, and the damping material is adhered to the shaped aluminum extrusion over a length of 10 to 25 m. Various methods may be employed for the adhesion, and examples thereof include a method of placing a damping material formed into a sheet shape on a predetermined position of the extruded material and heating the entirety to heat-bond the damping material to the aluminum surface under damping material's own weight.

In the case of reducing the weight of the vibration damping shaped aluminum extrusion of FIG. 8(a) by thinning of aluminum, since both rigidity and strength must be satisfied, sufficient weight reduction is sometimes difficult. Accordingly, the present inventor has made studies to reduce the weight of the damping resin while maintaining the damping effect.

FIG. 8(b) is a view showing a structure where the amount (width in the cross-section) of the damping material in the vibration damping shaped aluminum extrusion of FIG. 8(a) is simply reduced. In FIG. 8(b), the vibration amplitude distributions of the inclined rib and the face plate when the shaped aluminum extrusion is in a vibrating state are shown by a chain line.

As apparent from FIG. 8(b), the damping material provided on the face plate is disposed in the center of the flat part, but the damping material provided on the inclined rib is disposed only in the vicinity of the apex of the inverted triangle. This is because in the case of utilizing, as described above, the damping material's own weight as the method for adhering the damping material, the damping material adhered to the face plate can be disposed in the center of the flat part, but a vertically downward force acts on the damping material adhered to the inclined rib due to its own weight and therefore, the damping material can be disposed only in the vicinity of the apex of the inverted triangle. Accordingly, in the vibration damping shaped aluminum extrusion reduced in the amount of the damping material, the damping material provided on the flat part of the face plate has a narrow width as compared with the damping material of FIG. 8(a) but the damping material is disposed so as to correspond with the portion where the vibration amplitude shown by a chain line is large, and therefore, vibration of the face plate can be controlled. On the other hand, as for the damping material provided on the inclined rib, the damping material is disposed only in the vicinity of the apex of the inverted triangle, where the vibration amplitude is small, and therefore, it can be hardly said that vibration of the inclined rib is sufficiently controlled.

That is, in the case where, as shown in FIG. 8(b), the used amount of the damping material is simply reduced, the weight reduction may be achieved as compared with the vibration damping shaped aluminum extrusion of FIG. 8(a), but the damping effect is extremely impaired.

In view of these problems, an object of the present invention is to provide a vibration damping shaped aluminum extrusion having a weight reduction effect and having a high damping effect.

The present invention provides the following vibration damping shaped aluminum extrusion.

(1) A vibration damping shaped aluminum extrusion comprising a pair of face plates which face each other and a plurality of ribs connecting the face plates, wherein a damping material is provided at least on the central part of the rib in an inner surface of a hollow part formed by the face plate and the ribs.

(2) The vibration damping shaped aluminum extrusion according to (1), wherein the damping material is provided on the central part of the face plate in an inner surface of the hollow part.

(3) The vibration damping shaped aluminum extrusion according to (1) or (2), wherein a positioning recess is formed in the central part of the rib in order to provide a damping material on the central part of the rib, and the damping material is provided on the positioning recess.

(4) The vibration damping shaped aluminum extrusion according to any one of (1) to (3), wherein a positioning protrusion is formed in the central part of the rib in order to provide a damping material on the central part of the rib, and the damping material is provided on the rib so as to contact with the positioning protrusion.

(5) The vibration damping shaped aluminum extrusion according to any one of (1) to (4), wherein the rib is formed such that a thickness of the central part of the rib on which a damping material is provided is smaller than the thickness of a portion on which a damping material is not provided.

(6) The vibration damping shaped aluminum extrusion according to any one of (2) to (5), wherein the face plate is formed such that a thickness of the central part of the face plate on which a damping material is provided is smaller than the thickness of a portion on which a damping material is not provided.

(7) The vibration damping shaped aluminum extrusion according to any one of (2) to (5), wherein a positioning protrusion is formed in the central part of the face plate in order to provide a damping material on the central part of the face plate, and the damping material is provided on the face plate so as to contact with the positioning protrusion.

(8) The vibration damping shaped aluminum extrusion according to any one of (5) to (7), wherein the rib is formed such that a thickness of the rib is reduced from a branch part which is a connection portion with the face plate toward the central part.

(9) The vibration damping shaped aluminum extrusion according to any one of (6) to (8), wherein the face plate is formed such that a thickness of the face plate is reduced from a branch part which is a connection portion with the rib toward the central part.

According to the present invention, a vibration damping shaped aluminum extrusion having a weight reduction effect and a high damping effect can be realized.

BRIEF DESCRIPTION OF THE DRAWINGS

FIG. 6(a) is a view showing the configuration of a hollow shaped aluminum extrusion, and FIG. 6(b) is a view showing the configuration of a vibration damping shaped aluminum extrusion having a damping material thereon.

FIGS. 8(a) and 8(b) are view showing the configuration of a conventional vibration damping shaped aluminum extrusion; FIG. 8(a) is a view showing the configuration where a damping material is disposed to cover most of the inclined rib and the flat part, and FIG. 8(b) is a view showing the configuration where the used amount of a damping material is reduced.

DETAILED DESCRIPTION OF THE INVENTION

Embodiments for carrying out the present invention are described below based on the drawings.

First Embodiment

The first embodiment of the present invention is described by referring to FIGS. 1 to 3 and 5(a) to (d).

Figure 1:
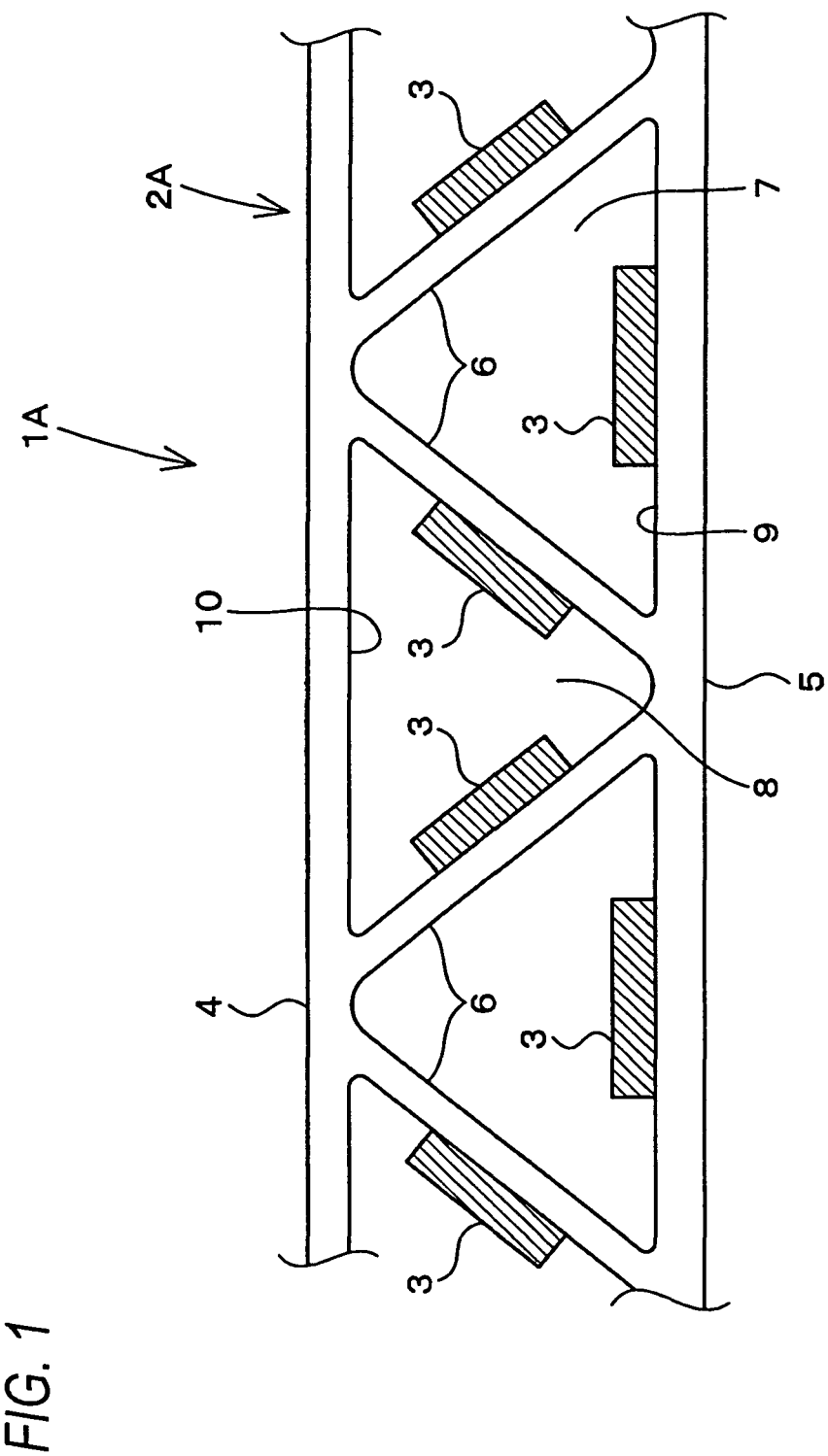
FIG. 1 is a cross-sectional view showing the configuration of the vibration damping shaped aluminum extrusion according to a first embodiment of the present invention.

FIG. 1 shows the configuration of a vibration damping shaped aluminum extrusion 1A according to this embodiment. The vibration damping shaped aluminum extrusion 1A is composed of a truss-type hollow shaped aluminum extrusion 2A and a damping resin 3. The shaped aluminum extrusion 2A is a truss cross-sectional long structural member produced from an aluminum alloy by extrusion processing. Accordingly, as shown in FIG. 1, the cross-section obtained by cutting the shaped aluminum extrusion 2A perpendicularly to the longitudinal direction is the same at any position in the longitudinal direction.

On this account, in the following, the shaped aluminum extrusion 2A and the vibration damping shaped aluminum extrusion 1A are described by illustrating the arrangement and shape in the cross-section shown in FIG. 1.

Referring to FIG. 1, the shaped aluminum extrusion 2A contains two face plates 4 and 5 (upper face plate 4 and lower face plate 5) which face each other and a plurality of inclined ribs 6 obliquely connecting the upper and lower face plates 4 and 5.

The plurality of ribs 6 are a flat plate member for zigzag connecting the upper and lower face plates. The plurality of ribs 6 are disposed to incline obliquely with respect to the horizontal direction of the upper and lower face plates 4 and 5 and arranged to let adjacent ribs 6 and 6 be alternately inclined in opposite directions, thereby realizing a truss structure. The shaped aluminum extrusion 2A having a truss structure has triangular hollow parts 7 and 8 between upper and lower face plates 4 and 5. The hollow parts 7 and 8 are a triangle shape surrounded by two adjacent inclined ribs 6 and 6 and the flat part of the face plate 4 or 5. In the hollow part 7 or 8, the portion corresponding to the upper or lower face plate 4 or 5 is referred to as a flat part 9 or 10.

Referring to FIG. 1, since the hollow part 7 including the flat part 9 of the lower face plate 5 is an upright triangle and the hollow part 8 including the flat part 10 of the upper face plate 4 is an inverted triangle, an upright triangular hollow part 7 and an inverted triangular hollow part 8 are alternately arranged between upper and lower face plates 4 and 5. In the following description, the upright triangular hollow part 7 is referred to as upright hollow part 7, and the inverted triangular hollow part 8 is referred to as inverted hollow part 8.

As shown in FIG. 1, in the vibration damping shaped aluminum extrusion 1A according to this embodiment, a damping resin (damping material) 3 is provided in the upright hollow part 7 and the inverted hollow part 8 of the shaped aluminum extrusion 2A. The damping resin 3 is provided on the flat part 9 of the lower face plate 5 in the upright hollow part 7 of the shaped aluminum extrusion 2A and is provided on two adjacent inclined ribs 6 in the inverted hollow part 8.

First, in the upright hollow part 7, the damping resin 3 is provided almost near the center (on the central part) of the flat part 9 of the lower face plate 5 in the cross-sectional width direction. In other words, the damping resin 3 is provided in the almost center of the upper surface of the lower face plate 5.

On the other hand, in the inverted hollow part 8, the damping resin 3 is provided almost near the center (on the central part) of each of two inclined ribs 6 in the cross-sectional width direction. In other words, the damping resin 3 is provided in the almost center of the upper surface side of the inclined rib 6. It is also possible to say that the damping resin 3 is provided in the almost center of each of surfaces of adjacent two inclined ribs 6.

Although not shown in FIG. 1, in the inverted hollow part 8, the damping resin 3 may be provided almost near the center of the flat part 10 of the upper face plate 4 in the cross-sectional width direction. In this case, the damping resin 3 may be provided on the upper surface of the upper face plate 4.

Figure 7A:
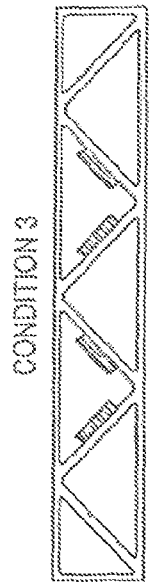
FIG. 7(a) is a view showing the case of disposing a conventional damping resin.
Figure 7B:
FIG. 7(b) is a view showing the case of disposing the damping resin in the present invention.
Figure 7C:
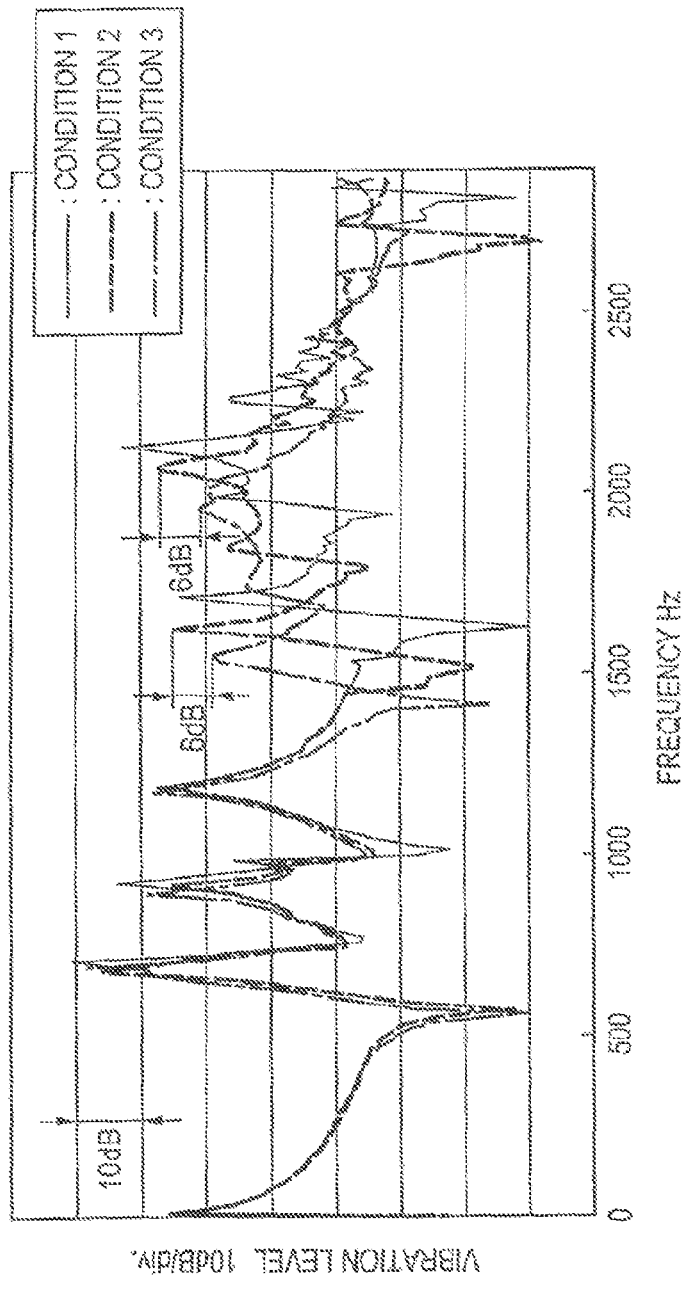
FIG. 7(c) is a graph illustrating the effects of the present invention.

The vibration damping shaped aluminum extrusion 1A according to this embodiment having such a configuration produces a damping effect as shown in FIGS. 7(a) to (c).

FIG. 7(c) is a graph illustrating the change in the vibration level of the upper surface of the upper face plate 4 with respect to the frequency when a sinusoidal alternating stress is caused to act at one point on the lower surface of the lower face plate 5 of the vibration damping shaped aluminum extrusion 1A and the frequency is changed by keeping the amplitude constant, where the frequency (Hz) is taken on the abscissa and the vibration level per unit vibrating force (10 dB/div.) is taken on the ordinate, and the results in the case of not providing a damping resin (damping material) 3 (condition 1), in the case of disposing a conventional damping resin 3 (condition 2; FIG. 7(a)), and in the case of disposing the damping resin 3 in the present invention (condition 3; FIG. 7(b)) are shown. In both the condition 2 and the condition 3, the damping resin 3 is not provided on the flat part 9 of the upright hollow part 7 but the same damping resin 3 is disposed only on the inclined rib 6. Accordingly, the difference of the damping effect due to the difference in the arrangement of the damping resin 3 on the inclined rib 6 is compared.

In the graph of FIG. 7(c), when the condition 2 by the conventional arrangement and the condition 3 by the arrangement of the present invention are compared, it is seen that the condition 3 yields a reduction of the vibration level by about 6 dB in the frequency range of 1,500 to 2,000 Hz and exerts a high damping effect.

That is, according to the vibration damping shaped aluminum extrusion 1A where a damping material is provided on the central part of at least one surface of the inclined rib 6, the vibration amplitude generated substantially in the centers of the face plates 4 and 5 and the inclined rib 6 in the longitudinal direction, as shown by a chain line in FIG. 8(b), can be unfailingly reduced and a high damping effect can be produced, while achieving weight reduction.

In this connection, the width of the damping resin 3 provided on the face plates 4 and 5 and the width (cross-sectional width) of the damping resin 3 provided on the inclined rib 6 can be appropriately changed according to the state of vibration intended to be controlled, but the present inventor has gained the following knowledge with respect to the width of the damping resin 3.

That is, the width of the damping resin 3 according to this embodiment is about 60% of the width of the face plate 4 or 5 (the flat part 9 or 10 defined by the distance between two inclined ribs 6). In addition, the width of the damping resin 3 provided on the inclined rib 6 is also about 60% of the width of the inclined rib 6. The damping resin 3 is provided such that the middle position of this damping resin 3 having a width of about 60% of the width of the flat part 9 or 10 or inclined rib 6 substantially corresponds with the middle position of the inclined rib 6 or the middle position of the flat part 9 or 10.

The ground for employing the numeral of about 60% and the ground for providing the resin on the middle position of the flat part 9 or 10 or the inclined rib 6 are described below.

Figure 2:
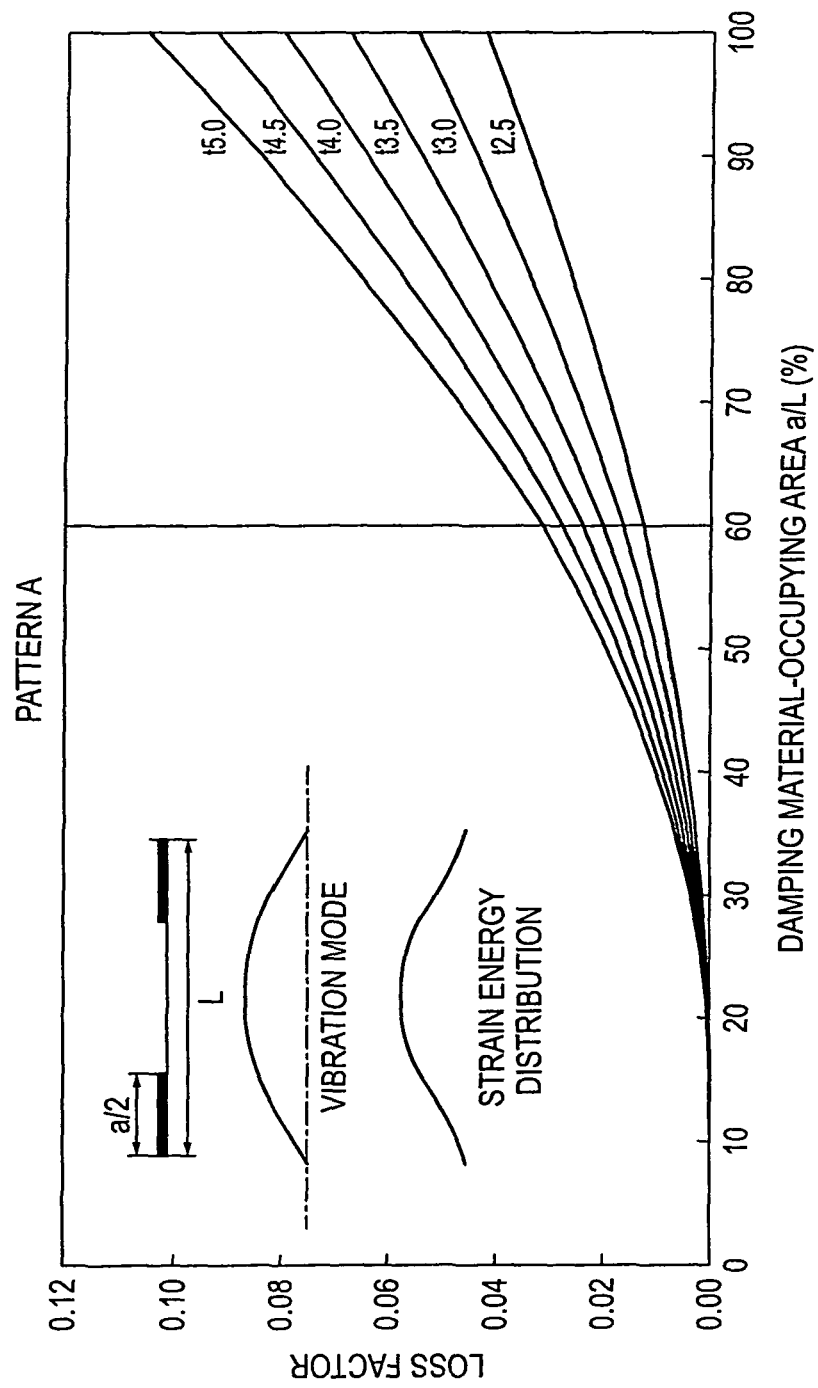
FIG. 2 is a view showing a graph illustrating the relationship between the damping material-occupying area and the loss factor (pattern of attaching a conventional damping material).
Figure 3:
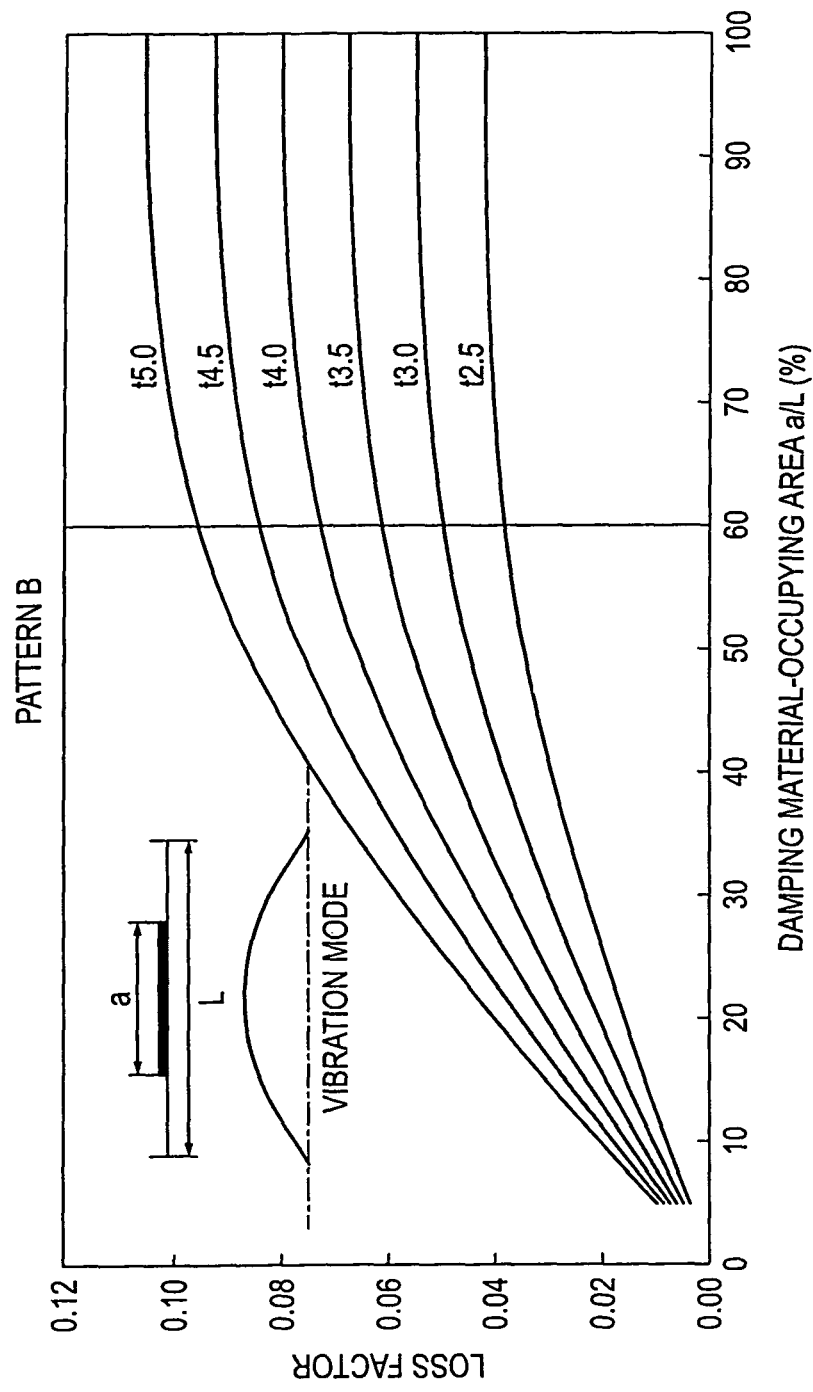
FIG. 3 is a view showing a graph illustrating the relationship between the damping material-occupying area and the loss factor (pattern of attaching the damping material of the present invention).

FIGS. 2 and 3 are graphs illustrating the loss factor when the flat part 9 or 10 or the inclined rib 6 is regarded as a beam of an aluminum substrate in which both ends are supported and the damping resin (damping material) 3 is attached to the beam in which the both ends are supported.

FIG. 2 illustrates, as a pattern A, a case where the damping material 3 is attached to both end parts of the beam of the aluminum substrate (thickness: 2.7 mm) in which the both ends are supported, and shows the results for the loss factor in the vibration mode shown in the graph when an experiment is performed on various damping materials 3 differing in the thickness t by changing the width a/2 of the damping materials 3 at both end parts with respect to the width L of the beam in which the both ends are supported.

FIG. 3 illustrates, as a pattern B, a case where the damping material 3 is attached to the middle position of the beam of the aluminum substrate (thickness: 2.7 mm) in which the both ends are supported, similarly to the vibration damping shaped aluminum extrusion 1A of this embodiment, and shows the results when the experiment is performed by changing the width a of the damping materials 3 in the same manner as in FIG. 2.

In FIG. 2, with respect to the width a that is the total of the widths a/2 of the damping materials 3 at both end parts, in the case where the damping material 3 is provided at a position giving a damping material-occupying area (occupancy) a/L (%) of 60%, that is, giving a damping material-occupying area a/L (%) of 30% at each of both end parts of the beam in which the both ends are supported, when the thickness t is 3.5 mm (t3.5), the loss factor indicative of the degree of vibration damping is about 0.02. However, in FIG. 3, in the case where the damping material 3 is provided at a position giving a damping material-occupying area a/L (%) of 60%, when the thickness t is 3.5 mm (t3.5), the loss factor indicative of the degree of vibration damping is about 0.06.

These reveal that even when the occupancy of the damping material 3 with respect to the width of the beam in which the both ends are supported is the same, the damping effect is higher in the case of attaching the damping material 3 at the middle position of the beam in which the both ends are supported. Also, according to the graph of FIG. 3, when the damping material-occupying area a/L (%) exceeds 60%, the rise of the loss factor becomes very small, and this reveals that a sufficient damping effect is obtained with a damping material-occupying area a/L (%) of about 60%.

It is understood that with respect to the damping materials 3 having the same thickness t, even when the width of the damping material 3 is decreased to about 60% of the width of the flat part 9 or 10 or the inclined rib 6 corresponding to the width L of the beam in which the both ends are supported, the damping effect is scarcely reduced. For this reason, the width of the damping material 3 which has been conventionally provided over the entire width of the flat part 9 or 10 or the inclined rib 6 of the shaped aluminum extrusion 2A can be decreased to about 60% of the width of the flat part 9 or 10 or the inclined rib 6, so that the weight of the vibration damping shaped aluminum extrusion 1A as a final product can be reduced.

In the graph shown in FIG. 3, the loss factor is increased substantially in proportion to the increment of the thickness t, and this reveals that when the thickness t of the damping material 3 is increased, the damping effect is enhanced. However, the increase in the thickness t of the damping material 3 leads to an increase in the weight of the vibration damping shaped aluminum extrusion 1A as a final product and inhibits weight reduction of the vibration damping shaped aluminum extrusion 1A and therefore, the thickness t of the damping material 3 may be appropriately selected according to the damping effect required.

Next, the material and configuration of the damping resin (damping material) 3 are described.

As described above, the thickness and material of the damping resin 3 are appropriately selected according to the required damping property. The thickness is, for example, approximately from 1 to 10 mm. As the material, examples thereof include a modified asphalt-based resin or a butyl rubber-based special synthetic rubber, which are excellent in the damping property. The damping resin 3 that is previously formed into a sheet shape may be disposed at a predetermined position and then heated to melt the adhesive surface of the damping resin, thereby fusion-bonding to the aluminum surface under damping resin's own weight. However, the present invention is not limited to such a method, and examples thereof include a method where a damping resin dissolved in a solvent to make a liquid is discharged from a nozzle tip inserted into a hollow part, and then, the liquid is coated on the inner surface of the hollow part. Examples thereof further include a method where a sheet or a liquid prepared by previously dispersing and kneading a thermally decomposable foaming agent in the damping resin is disposed and coated at a predetermined position on an aluminum surface of a hollow part, followed by heating to achieve adhesion and cause foaming of the damping resin, thereby increasing the thickness of the damping resin. When such a foaming-type damping material is used, the self weight of the damping material can be reduced by setting the thickness small as compared with a non-foaming type damping material so as to prevent the damping material from slippage or drooping/falling when the adhesion by heating, and the increased thickness after foaming makes it possible to more reduce the weight while maintaining sufficient damping property.

The damping resin 3 is not limited to a resin formed of a homogeneous material over the whole, and a damping resin having a two-layer laminated structure where the outer surface side is composed of a rigid material and the inner surface side is composed of a soft and self-bondable material, may be also used. Furthermore, in order to enhance the damping property or add other functions, a plastic film or a thin film differing in the material, such as an aluminum foil, may be laminated on the entire surface or a partial surface of the damping resin 3.

In producing the vibration damping shaped aluminum extrusion 1A of this embodiment, first, a shaped aluminum extrusion 2A is horizontally placed, and not only a damping resin 3 is disposed on the flat surface 9 of the upright hollow part 7 but also a damping resin 3 is disposed on the central part of one inclined rib 6 of the inverted hollow part 8 in the width direction. Thereafter, the entire shaped aluminum extrusion 2A in which the damping resin 3 is disposed on predetermined positions, is heated by putting in a heating furnace, as a result, the adhesive layer integrally formed on the adhesive surface side of the damping resin is mixed through melting, whereby the damping resin 3 is fusion-bonded to the flat surface 9 or 10 and the inclined rib 6 under its own weight.

In the heating process of the vibration damping shaped aluminum extrusion 1A, the adhesive interface between aluminum and the damping resin 3 disposed on the central part of the inclined rib 6 in the width direction is softened and melted and therefore, depending on the material of the damping resin 3, the damping resin 3 may move downward along the rib by the effect of gravity acting vertically in the downward direction. In this case, nearly a state shown in FIG. 8(b) results, and there arises a problem that the damping resin 3 cannot be finally disposed on the central part of the inclined rib 6 in the width direction.

Figure 5A:
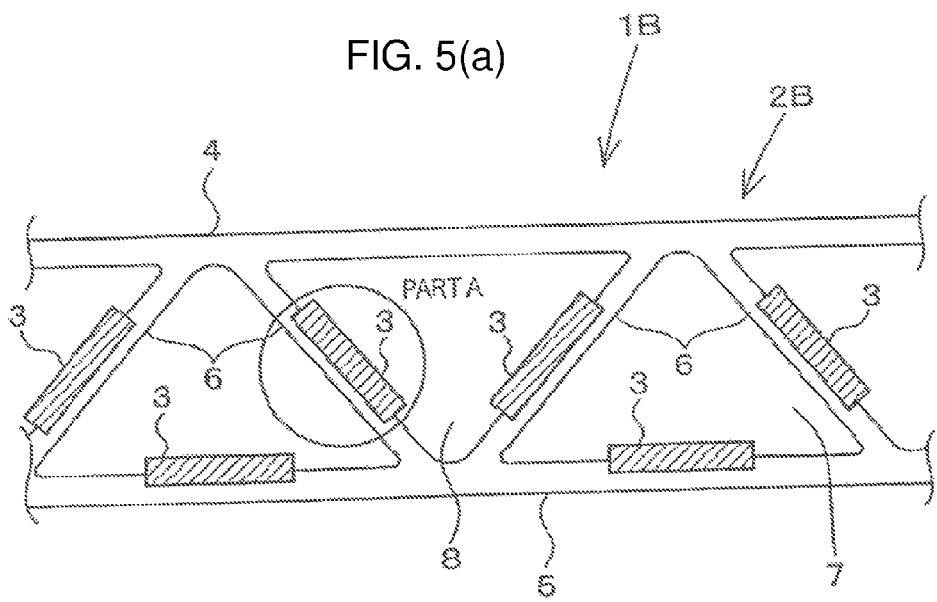
FIG. 5(a) is a cross-sectional view showing the configuration of the vibration damping shaped aluminum extrusion according to first and second embodiments of the present invention.
Figure 5B:
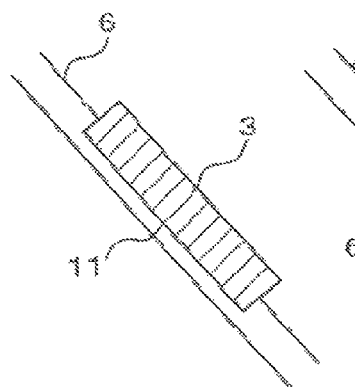
FIGS. 5(b) to 5(d) are cross-sectional views showing configuration examples of part A shown in FIG. 5(a).

In order to avoid this problem, the present inventor has found a method where, as shown in FIG. 5(b), a positioning recess 11 is formed in the central part of the inclined rib 6 and after filling the positioning recess 11 with the damping resin 3, the shaped aluminum extrusion 2A is heated. The positioning recess 11 is a recessed groove formed on the inclined rib 6 and extends along the longitudinal direction of the shaped aluminum extrusion 2A.

Figure 5C:
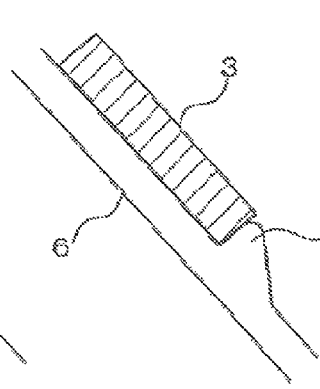
Figure 5D:
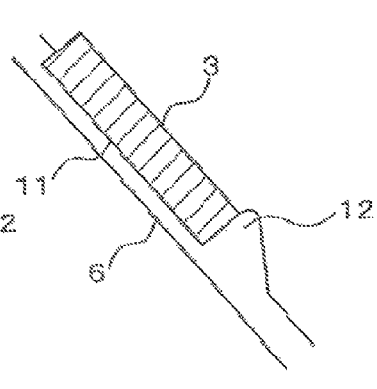

The present inventor has also found a method where, as shown in FIG. 5(c), a positioning protrusion 12 is formed in the vicinity of the central part of the inclined rib 6 and after placing the damping resin 3 on the inclined rib 6 so as to contact with the positioning protrusion 12, the shaped aluminum extrusion 2A is heated. The positioning protrusion 12 is a protrusion formed on the inclined rib 6 and linearly extends along the longitudinal direction of the shaped aluminum extrusion 2A. As shown in FIG. 5(d), a shape having both configurations may be also employed.

In this way, by forming positioning means, that is, a positioning recess 11 or a positioning protrusion 12, on the inclined rib 6 and using the positioning means, the damping resin 3 can be unfailingly disposed on the central part of at least one surface of the inclined rib 6. In addition, the vibration amplitude generated substantially in the center of the inclined rib 6 in the longitudinal direction can be reliably reduced.

Second Embodiment

The second embodiment of the present invention is described below by referring to FIGS. 4 and 5(a) to (d).

As shown in FIG. 5(a) to (d), the vibration damping shaped aluminum extrusion 1B according to this embodiment has almost the same configuration as the vibration damping shaped aluminum extrusion 1A according to the first embodiment, and the shaped aluminum extrusion 2B has a difference only in the configuration of the central part of the inclined rib 6, on which the damping resin 3 is provided. Specifically, the inclined rib 6 is configured to have a small thickness only in the central part on which the damping resin 3 is provided.

Figure 4:
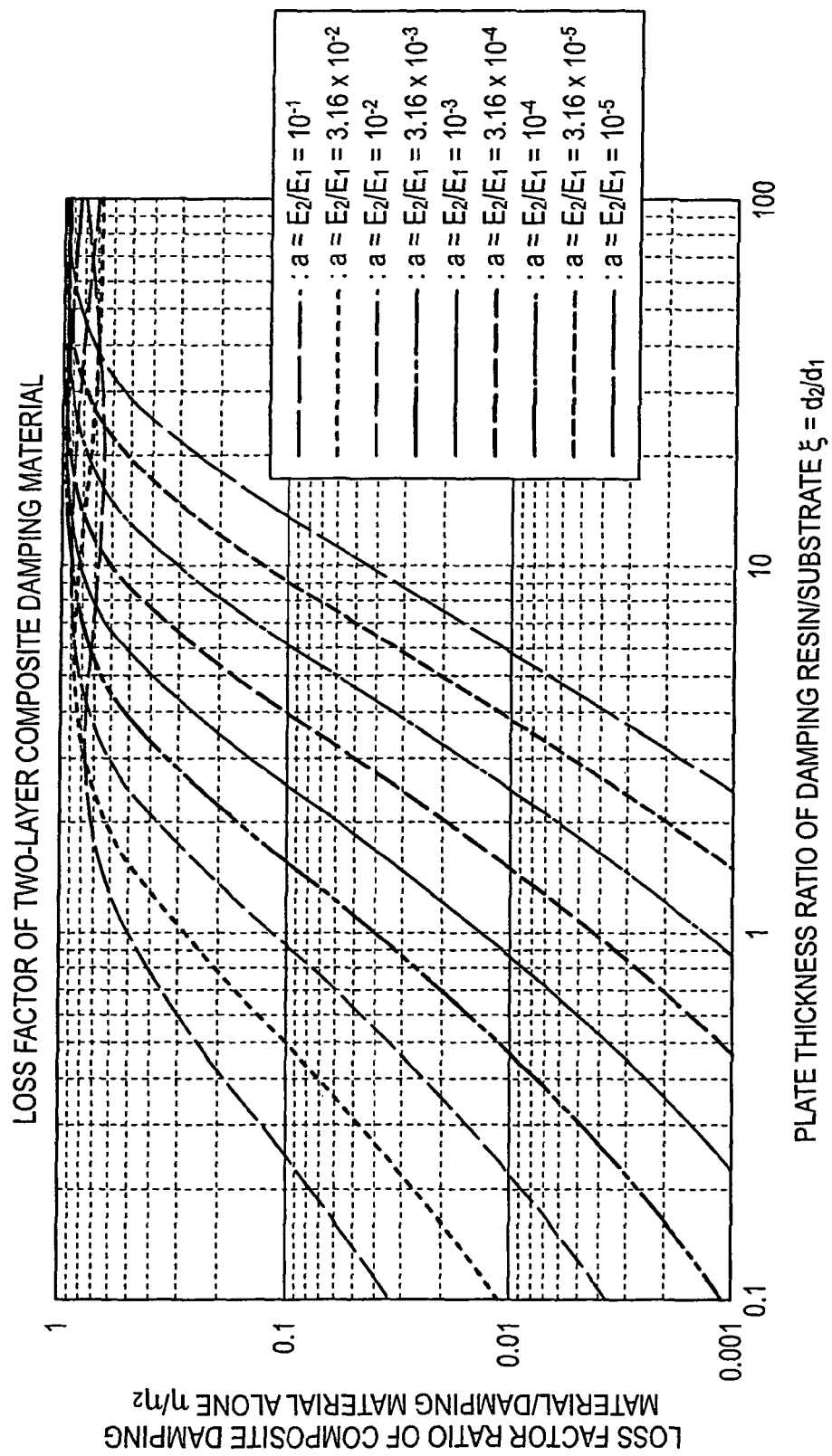
FIG. 4 is a view showing a graph illustrating the relationship between the ratio of the plate thickness of the damping resin to the aluminum substrate and the loss factor indicative of the degree of vibrational damping.

The reason for reducing the thickness of the central part is described by referring to FIG. 4. FIG. 4 is a graph illustrating the relationship between the plate thickness regarding a two-layer composite damping material composed of a substrate and a damping resin 3 and the loss factor. In the graph of FIG. 4, the ratio ($\mu = d_2/d_1$) of the thickness $d_2$ of the damping resin 3 to the plate thickness $d_1$ of the substrate is taken on the abscissa, and the ratio ($\eta/\eta_2$) of the loss factor $\eta$ of the two-layer composite damping material to the loss factor $\eta_2$ of the damping resin 3 alone is taken on the ordinate. FIG. 4 shows the results when the ratio a ($E_1/E_2$) of the Young's modulus $E_2$ of the damping resin 3 to the Young's modulus $E_1$ of the substrate is variously changed.

As seen from the results of FIG. 4, in a two-layer composite damping material, when the ratio of the thickness $d_2$ of the damping resin 3 to the plate thickness $d_1$ of the substrate becomes large, the damping effect is increased, and therefore, it is understood that the damping effect can be enhanced by relatively changing the sizes of the plate thickness $d_1$ of the substrate and the thickness $d_2$ of the damping resin 3, for example, by decreasing the thickness of the portion overlapping with the damping resin 3 in the substrate, even without changing the thickness of the damping resin 3.

On this account, in the vibration damping shaped aluminum extrusion 1B according to this embodiment, as shown in FIG. 5(a), the thickness of the inclined rib 6 is reduced only in the central part shown as part A in FIG. 5(a). Specifically, as shown in FIG. 5(b), the thickness of the inclined rib 6 is reduced only in the portion corresponding to the width of the damping resin 3 (the central part of the inclined rib). As a result, the ratio of the thickness of the damping resin 3 to the plate thickness in the central part of the inclined rib 6 as the substrate is increased and therefore, the damping effect of the inclined rib 6 can be enhanced. In addition, the damping effect of the vibration damping shaped aluminum extrusion 1B as a whole can be enhanced.

As shown in FIG. 5(b), by merely reducing the thickness of the central part of the inclined rib 6, the central part becomes a recess, and this recess can be employed as a positioning recess 11. Thanks to the recess 11, as described above, the damping resin 3 can stay in the recessed central part without sliding down the inclined rib 6. That is, after disposing the damping resin 3 on the flat part 9 of the upright hollow part 7 and on the inclined rib 6 of the inverted hollow part 8 at the same time in a state where the shaped aluminum extrusion 2B is placed horizontally, the damping resin 3 can be fusion-bonded by one heating of the shaped aluminum extrusion 2B. In the flat part 9 of the upright hollow part 7, the thickness of the central part may be reduced to form a recess. Furthermore, needless to say, the same effect is exerted also by the configuration of FIG. 5(d).

In addition, when the above-described foaming-type damping resin is used as the damping resin 3, even if, in FIG. 4, the Young's modulus $E_2$ of the damping resin is reduced due to foaming, the thickness ratio $\xi$ between the substrate and the damping resin becomes large, and this makes it possible to more reduce the weight while maintaining the loss factor of the composite damping material.

As described above, the vibration damping shaped aluminum extrusion 1B according to this embodiment can enhance the damping effect without increasing the amount of the damping resin 3. Moreover, in the process of producing the vibration damping shaped aluminum extrusion 1B, the damping resin 3 can be unfailingly disposed on the central part of the inclined rib 6.

Third Embodiment

The third embodiment of the present invention is described below by referring to FIGS. 6(a) and 6(b).

Figure 6A:
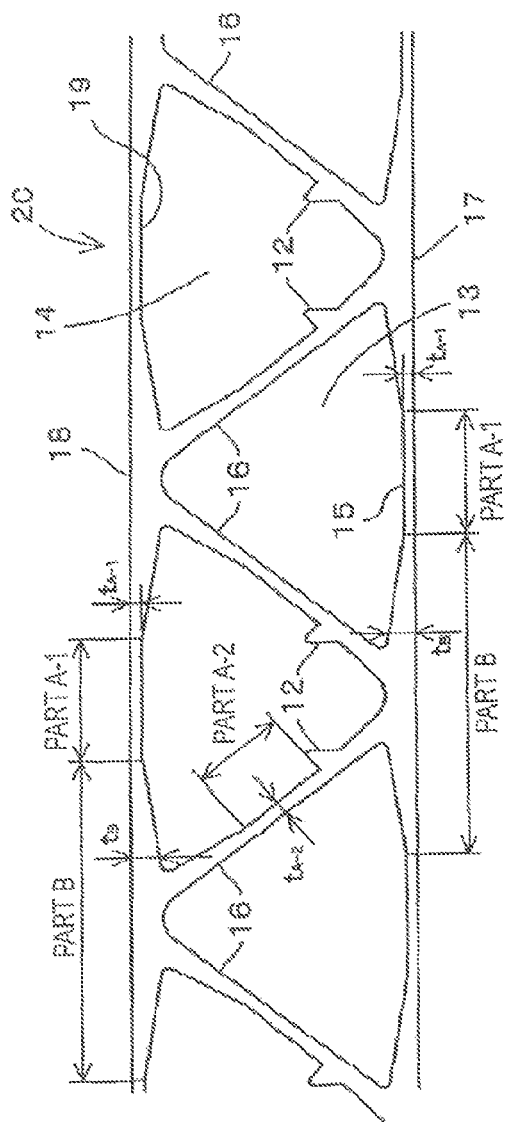
FIGS. 6(a) and 6(b) are view showing the configuration of the vibration damping shaped aluminum extrusion according to a third embodiment of the present invention.
Figure 6B:
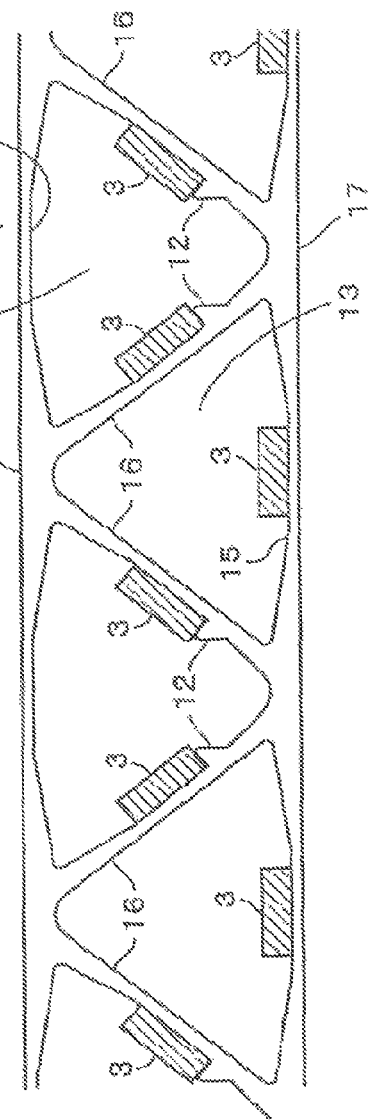

As shown in FIG. 6(b), the vibration damping shaped aluminum extrusion 1C according to this embodiment has a configuration where, similarly to the vibration damping shaped aluminum extrusion 1A according to the first embodiment, the shaped aluminum extrusion 2C has an upright hollow part 13 and an inverted hollow part 14.

However, in the vibration damping shaped aluminum extrusion 1C according to this embodiment, the configurations of the upright hollow part 13 and the inverted hollow part 14 differ from those of the upright hollow part 7 and the inverted hollow part 8 in each of the first and second embodiments and are described below.

Specifically, these parts are configured such that the thickness of the flat part 15 of the upright hollow part 13 is gradually (gradiently) decreased from both ends toward the central part, and the thickness of the inclined rib 16 of the inverted hollow part 14 is gradually (gradiently) decreased from both ends toward the central part.

In the upright hollow part 13, the thickness of the flat part 15 of the face plate 17 is gradiently reduced from its both end parts toward the central part. That is, the thickness of the face plate 17 is decreased from both end parts ($t_B$) toward the central part (part A-1) of the flat part 15, and the thickness is smallest ($t_{A-1}$) in the central part of the flat part 15.

Also, in the inverted hollow part 14, the inclined rib 16 is inclined while decreasing the thickness of the inclined rib 16 from the upward end part toward the central part. That is, the thickness of the inclined rib 16 is decreased from the upper end toward the central part of the inclined rib 16, and the thickness is smallest ($t_{A-2}$) in the central part (part A-2) of the inclined rib 16. In addition, a protrusion 12 is provided at the lower end of the central part. Also in the inverted hollow part 14, in the flat part 19 of the face plate 18, the thickness may be gradiently reduced from its both ends toward the central part.

The damping resin 3 is provided in the shaped aluminum extrusion 2C configured as shown in FIG. 6(a), whereby the vibration damping shaped aluminum extrusion 1C shown in FIG. 6(b) is obtained. This makes it possible to reduce the thickness of the central part (part A-1, part A-2) on which the damping resin 3 is provided, and a vibration damping shaped aluminum extrusion 1C having a high damping effect can be obtained. Also, since a protrusion 12 is provided at the lower end of the central part (part A-2) of the inclined rib 16, even in the state where the shaped aluminum extrusion 2C is placed horizontally in the process of producing the vibration damping shaped aluminum extrusion 1C, the damping resin 3 can be easily disposed on the central part of the inclined rib 16. By thus gradiently reducing the thickness of each of the face plate and the rib toward the central part from the connection part (both ends) between the face plate and the lib, not only the rigidity and strength of the truss-type hollow shaped aluminum extrusion are enhanced, but also since the thickness of the connection part between the face material and the rib is gradiently increased as compared with the central part during the extrusion processing of aluminum and the cross-sectional area of the connection part is thereby increased, extrusion resistance can be reduced, as a result, a collateral effect that the dimensional accuracy is enhanced and stabilized can be also expected.

The embodiments disclosed in this specification are illustrative in all points and should not be construed as being limitative. Above all, as for the matters demonstratively disclosed in these embodiments, such as operation conditions, measurement conditions, various parameters, and dimensions, weights and volumes of constituent materials, a value not departing from the range usually used by one skilled in the art and being easily envisageable by one skilled in the art is employed.

In the embodiments above, each of the vibration damping shaped aluminum extrusions 1A to 1C is described in a horizontal manner along the right/left direction on the paper surface as shown in FIGS. 1, 5 and 6, and each of face plates 4 and 18 referred to as the upper face plate and each of face plates 5 and 17 are referred to as the lower face plate, respectively. However, the terms "upper" and "lower" related to these face plates are employed for the convenience of explanation and are not used to limit the direction such as up/down and front/back when actually using the vibration damping shaped aluminum extrusions 1A to 1C.

For example, in the case of using each of the vibration damping shaped aluminum extrusions 1A to 1C for a roof in the body structure of railway vehicles, the up/down directions are sometimes reversed and in this case, the "upper" and "down" used for the face plate or rib are exchanged. Also, in use for a side wall, the vibration damping shaped aluminum extrusion may be erected substantially vertically. At this time, the upper face plate 4 or 18 and the lower face plate 5 or 17 become a leftside face plate and a rightside face plate (or a rightside face plate and a leftside face plate), respectively.

Furthermore, an object to which the technique of the present invention is applied is not limited to a shaped aluminum extrusion configured such that a pair of face plates which face each other are flat and parallel, and may be a shaped aluminum extrusion where the pair of face plates which face each other are not flat or not parallel. That is, in the step of disposing the damping material at a predetermined position and then heating the shaped aluminum extrusion as a whole to heat-bond the damping material to the shaped aluminum extrusion, the face plate need not be always kept in a horizontal plane, and not only the inclined rib but also the face plate are sometimes inclined with respect to the horizontal plane. In such a case, in order to stably dispose the damping material on the central part of the face plate as well as on the inclined rib, the damping material must be prevented from slippage by providing the same protrusion or recess as provided in the rib.

In addition, the technique of the present invention is not limited to a truss-type hollow shaped aluminum extrusion but may be applied also to a ladder-shaped hollow shaped aluminum extrusion where the rib is perpendicular to the face plate. The technique of the present invention is not limited to the arrangement of a damping material on a rib but may be applied also to a case of disposing the damping material only on a face plate.

This application is based on Japanese Patent Application No. 2011-179721 filed on Aug. 19, 2011, the entire subject matter of which is incorporated herein by reference.

What is claimed is:

1. A vibration damping shaped aluminum extrusion comprising a pair of face plates which face each other and a plurality of ribs connecting the face plates, wherein a damping material is provided at least on the central part of the rib in an inner surface of a hollow part formed by the face plate and the ribs,
wherein a positioning protrusion is formed in the central part of the rib in order to provide a damping material on the central part of the rib, and the damping material is provided on the rib so as to contact with the positioning protrusion;
the rib is formed such that a thickness of the central part of the rib on which a damping material is provided is smaller than the thickness of a portion on which a damping material is not provided, and
the surface of the rib on which the damping material is provided is a flat surface.

2. The vibration damping shaped aluminum extrusion according to claim 1, wherein the damping material is provided on the central part of the face plate in an inner surface of the hollow part.

3. The vibration damping shaped aluminum extrusion according to claim 1, wherein a positioning recess is formed in the central part of the rib in order to provide a damping material on the central part of the rib, and the damping material is provided on the positioning recess.

4. The vibration damping shaped aluminum extrusion according to claim 2, wherein the face plate is formed such that a thickness of the central part of the face plate on which a damping material is provided is smaller than the thickness of a portion on which a damping material is not provided.

5. The vibration damping shaped aluminum extrusion according to claim 2, wherein a positioning protrusion is formed in the central part of the face plate in order to provide a damping material on the central part of the face plate, and the damping material is provided on the face plate so as to contact with the positioning protrusion.

6. The vibration damping shaped aluminum extrusion according to claim 1, wherein the rib is formed such that a thickness of the rib is reduced from a branch part which is a connection portion with the face plate toward the central part.

7. The vibration damping shaped aluminum extrusion according to claim 4, wherein the face plate is formed such that a thickness of the face plate is reduced from a branch part which is a connection portion with the face plate toward the central part.

8. The vibration damping shaped aluminum extrusion according to claim 1,
wherein a ratio of occupancy of the damping material with respect to each of ribs is approximately 60%.

* * * * *